United States Patent [19]

Crowther

[11] 4,251,321
[45] Feb. 17, 1981

[54] NUCLEAR REACTOR UTILIZING PLUTONIUM

[75] Inventor: Russell L. Crowther, Saratoga, Calif.

[73] Assignee: General Electric Company, San Jose, Calif.

[21] Appl. No.: 347,916

[22] Filed: Apr. 4, 1973

Related U.S. Application Data

[63] Continuation of Ser. No. 48,875, Jun. 15, 1970, abandoned, which is a continuation of Ser. No. 691,044, Dec. 15, 1967, abandoned.

[51] Int. Cl.$^2$ .............................................. G21C 3/30
[52] U.S. Cl. ....................................... 176/78; 176/17; 176/54
[58] Field of Search .................. 176/17, 18, 78, 76, 176/54–56, 73

[56] References Cited

U.S. PATENT DOCUMENTS

| | | | |
|---|---|---|---|
| 3,042,598 | 7/1962 | Crowther | 176/78 |
| 3,104,219 | 9/1963 | Sulzer | 176/78 |
| 3,147,191 | 9/1964 | Crowther | 176/78 |
| 3,230,151 | 1/1966 | Mills et al. | 176/73 |
| 3,275,525 | 9/1966 | Bloomster et al. | 176/73 |
| 3,341,420 | 9/1967 | Sevy | 176/18 |
| 3,349,004 | 10/1967 | Lass et al. | 176/78 |

OTHER PUBLICATIONS

Leblanc, J. M., *Proceedings of the Third International Conference on the Peaceful Uses of Atomic Energy*, vol. 10, Nuclear Fuels-1. Fabrication and Reprocessing, Geneva, Aug. to Sep. 1964, pp. 12–24.
EURAEC-1666, pp. 2–3, 22, 35, 40, 41, and Table X.
Directory of Nuclear Reactors, vol. III, International Atomic Energy Agency, (IAEA) 1960, pp. 331–336, 341–354.

*Primary Examiner*—S. A. Cangialosi
*Attorney, Agent, or Firm*—Ivor J. James, Jr.; Samuel E. Turner; Raymond G. Simkins

[57] ABSTRACT

This describes a fuel assembly for utilizing plutonium fuel in combination with other nuclear fuel in a nuclear reactor core. The plutonium fuel is placed in a separate zone in the fuel assembly to take advantage of the characteristics of the plutonium fuel. Fuel costs may be reduced by mixing the plutonium fuel with natural or depleted uranium. Fabrication costs can be minimized by placing the plutonium in less than all of the fuel elements of the assembly.

8 Claims, 11 Drawing Figures

NUCLEAR REACTOR UTILIZING PLUTONIUM

This is a continuation of application Ser. No. 48,875, filed June 15, 1970 (now abandoned) which, in turn is a continuation of application Ser. No. 691,044 filed Dec. 15, 1967.

The release of large amounts of energy through nuclear fission reactions is now well known. In general, a fissile (fissionable) atom such as U-233, U-235, Pu-239, or Pu-241 absorbs a thermal or epithermal neutron in its nucleus and undergoes a nuclear disintegration or fission. This produces, on the average, two fission products of lower atomic weight with great kinetic energy and also several fission neutrons of high energy.

The kinetic energy of the fission products is dissipated as heat in the fuel elements of the reactor. If there is at least one net neutron remaining on the average from each fission event and this neutron induces a subsequent fission event, the fission reaction becomes self-sustaining and thus the heat generation is continuous. The heat is removed to perform useful work by passing a working medium or coolant such as water in heat exchange relationship with the fuel elements.

As the sustained reaction continues the fissionable atoms are gradually consumed. Some of the fission products produced are neutron absorbers (fission product poisons) which by their capture of neutrons lower the number of neutrons available to cause fission. This decreases the fission reactivity and hence the heat produced. For further information on nuclear power reactors see, for example, "Nuclear Power Engineering", M. M. El-Wakil, McGraw-Hill Book Company, Inc., 1962.

In a known type of nuclear reactor, for example as used in the Dresden nuclear power station near Chicago, Illinois, the reactor core is of the heterogeneous type. That is, the nuclear fuel is in the form of elongated, cladded rods. These fuel rods or elements are grouped together at fixed distances from one another in a coolant flow channel or region as a separately removable fuel assembly or bundle. A sufficient number of fuel assemblies are arranged in matrix to form the nuclear reactor core capable of the self-sustained fission reaction mentioned hereinbefore. Thus, from the point of view of fueling or refueling the reactor core, the removable fuel assembly (or bundle of fuel rods) is the basic replaceable subdivision of the nuclear fuel.

Details of this Dresden reactor have been widely published, for example, see "Reactors on Line-Dresden Nuclear Power Station", *NUCLEONICS*, December 1959 and references cited therein, particularly C. N. Spalaris, "Fuel Elements for the Dresden Nuclear Power Station", *NUCLEAR ENGINEERING* 4,253 (1959).

To provide a reasonable fuel cycle period the initial fuel core is designed with predetermined excess reactivity, the reactivity being controlled by a system of neutron absorbing or poison materials. The control materials may take several forms including burnable poisons, temporary curtains, soluble poisons in the coolant and mechanical control in the form of a plurality of selectively actuatable control rods which can be inserted into and withdrawn from the core. When, because of fuel burnup and poison buildup, the core can no longer maintain criticality, some or all of the fuel assemblies must be replaced. According to known refueling schemes, only a fraction, for example 20–30 percent, of the fuel assemblies are replaced at each refueling to restore the required excess reactivity of the core.

In commonly used nuclear power reactor fuel, fertile materials such as U-238 are included in addition to the above-noted fissionable atoms. For example, a commonly used fuel consists of uranium dioxide ($UO_2$) in which approximately 2 percent of the uranium atoms are U-235 which are fissionable in a thermal neutron flux, while the remaining 98 percent of the uranium atoms are the fertile isotope U-238 which are not significantly fissionable in a thermal neutron flux. In the course of operating the reactor the fissionable atoms (U-235) are gradually consumed and a part of the fertile atoms (U-238) are converted into a fissionable isotope (Pu-239). The concentration of Pu-239 gradually rises and approaches an equilibrium value. Since the Pu-239 atoms are fissionable by thermal neutrons, they contribute to the maintenance of the chain fission reaction.

Normally, in a thermal reactor (a reactor in which most of the fission are caused by thermal neutrons) the rate of production of fissionable atoms is less than the rate of fissionable atom consumption. Also, as noted above, some of the fission products produced are neutron absorbers or poisons. Thus the potential reactivity of the fuel charge decreases with time and if the design power level is to be maintained, the reactor eventually must be refueled by replacement of some or all of the irradiated fuel assemblies or bundles as mentioned hereinbefore.

The spent or irradiated fuel removed from the reactor contains, in addition to a valuable quantity of the original fissionable material, a significant quantity of plutonium including fissionable Pu-239 and Pu-241 and fertile Pu-240. Such spent or irradiated fuel can be reprocessed to separate and recover the uranium and plutonium for reuse. (A process for recovering products of irradiated fuel is disclosed, for example, in U.S. Pat. No. 3,222,124.)

When the cost of the recovered plutonium fuel becomes comparable to the cost of uranium fuel then it becomes desirable for economic reasons to utilize such plutonium fuel in refueling the reactor and/or in initial fueling of a reactor.

The nuclear characteristics of plutonium fuel are dependent upon the isotopic content of the plutonium, that is, the relative amounts of Pu-239, Pu-240, Pu-241 and Pu-242. The relative amount of Pu-240, in particular, is important because of its large neutron capture resonance at about 1 electron volt. Neutron captures in Pu-240 produce Pu-241, which is fissionable by low energy thermal neutrons.

The use of plutonium fuel in a reactor originally designed to use uranium fuel requires consideration of differences in reactor performance because of the differences in the nuclear characteristics of the two fuels. Among the significant differences pertinent to reactor performance are the following:

1. The thermal neutron capture and fission cross sections of the fissile isotopes, Pu-239, and Pu-241, are greater than those of the fissile uranium isotope U-235. When plutonium fuel is placed in a fuel assembly which also contains a fertile material such as U-238, the plutonium competes more strongly with U-238 for neutrons than would U-235. The plutonium fuel thus reduces the production of new Pu-239 from the fertile U-238. However, if there is an appreciable amount of the fertile Pu-240 in the plutonium fuel, the production of fissile Pu-241 therefrom can more than offset the decrease in the conversion of U-238 to Pu-239. Because of the initial large depletion of fissile material in a fuel element containing plutonium fuel, the average fuel-assembly fission cross section tends to decrease more rapidly with fuel irradiation than the average fission cross section of a fuel assembly containing only enriched uranium fuel. However, if the plutonium fuel contains sufficient fertile Pu-240 (as for example the plutonium of isotopic composition typical of spent power reactor uranium fuel) the production of new fissile Pu-241 from the Pu-240 can cause the average fuel-assembly ratio of thermal neutron fissions to thermal neutron absorptions (fissions plus captures) to vary less rapidly with fuel irradiation than in the case of a fuel assembly containing only enriched uranium fuel.

2. Excess hot reactivity is reduced because of the neutron captures in the high-cross-section fertile isotope Pu-240. Concomitantly, plutonium fuel suffers less change in reactivity with exposure.

3. The delayed neutron fraction of plutonium fuel is less than that of uranium fuel.

4. Control rod worth is reduced because of the greater competition for neutrons provided by plutonium fuel as compared to uranium fuel.

5. As pertinent to a boiling water reactor, plutonium fuel has a greater negative void coefficient of reactivity than uranium fuel (for the same water-to-fuel ratio), due primarily to moderator density dependence of the resonance absorption in Pu-240.

The object of the invention is to utilize plutonium fuel with enriched uranium fuel in a nuclear reactor in such a way as to make maximum advantageous use of the different nuclear and economic characteristics of each fissile nuclide.

A more specific object of the invention is to utilize plutonium fuel for refueling a nuclear reactor.

Another object of the invention is to provide a nuclear fuel assembly containing plutonium fuel which is unevenly distributed among the fuel rods of the assembly.

Another object of the invention is to provide a nuclear fuel assembly containing plutonium fuel which is interchangeable in a nuclear reactor with a fuel assembly initially containing only uranium fuel.

Another object of the invention is to provide a nuclear fuel assembly containing plutonium fuel in the outer and enriched fissile uranium in the inner fuel elements of the assembly.

Another object of the invention is to provide a nuclear fuel assembly wherein plutonium fuel is concentrated in the inner fuel elements of the assembly and enriched fissile uranium is utilized in the outer fuel elements.

The plutonium recovered from spent or irradiated fuel from a thermal reactor is a mixture of several isotopes of plutonium including fissionable Pu-239 and Pu-241, fertile Pu-240, and Pu-242 which in a thermal reactor is a parasite or poison. An isotopic composition of plutonium typical of spent uranium fuel from a boiling water reactor is as follows:

| Isotope | Atom Fraction |
| --- | --- |
| Pu-239 | 0.590 |
| Pu-240 | 0.257 |
| Pu-241 | 0.121 |
| Pu-242 | 0.032 |

It is desirable to avoid the cost of separating these chemically similar plutonium isotopes.

Thus another object of the invention is to provide a nuclear fuel assembly utilizing plutonium fuel having an isotopic composition of plutonium typical of the plutonium recovered from irradiated nuclear fuel.

These and other objects of the invention are achieved by providing a fuel element assembly containing a combination of plutonium and uranium fuel wherein the concentration of plutonium and uranium fuel is non-uniform or zoned among the fuel elements across the fuel assembly to optimally utilize the different characteristics of each fissile material to achieve improvements in power capability or fuel performance.

In accordance with a first embodiment of the invention the plutonium fuel is concentrated in the outer or peripheral fuel elements of the assembly near the regions or zones or highest neutron moderation, that is, near zones of lowest thermal neutron energy and enriched fissile uranium is utilized in a central zone. This arrangement provides for optimization of fuel cycle costs and fuel reliability.

In accordance with a second embodiment of the invention the plutonium fuel is concentrated in the inner fuel elements of the fuel assembly and enriched fissile uranium is utilized in the outer rods. This arrangement provides for optimization of power and critical heat flux shaping by taking advantage of the increase in the ratio of the thermal neutron fission cross section of fissile plutonium to the thermal neutron fission cross section of fissile uranium with increasing voids and of the unique higher heat flux capability of the central fuel elements of a boiling water reactor fuel assembly.

Further features and advantages of the invention are presented in the following more specific description with reference to the accompanying drawing wherein.

Figure 1:
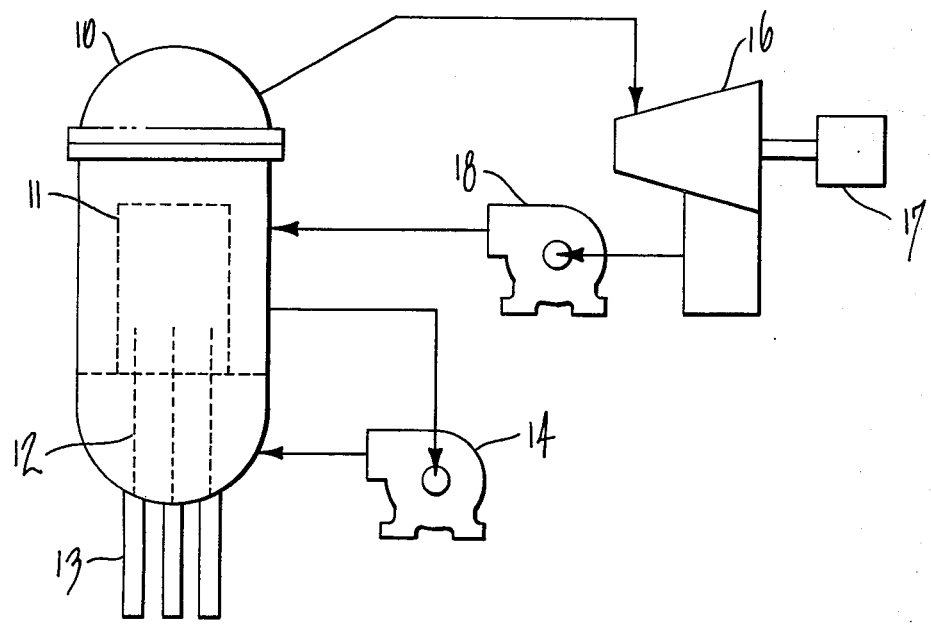
FIG. 1 is a schematic diagram of a typical nuclear reactor power plant.

While not limited thereto, the utilization of plutonium fuel in accordance with the present invention is described herein in connection with a boiling water reactor, an example of which is illustrated schematically in FIG. 1. Such a reactor system includes a pressure vessel 10 within which is disposed a nuclear chain reactor core 11 submersed in a moderator-coolant such as light water. The core 11 includes a plurality of spaced nuclear fuel assemblies, each of which comprises a plurality of fuel elements positioned in spaced relation within a coolant flow channel. A plurality of control rods 12 (shown in dotted lines) of cruciform shape and containing neutron absorbing material, are selectively insertable into the spaces among the fuel assemblies by drive means 13 for mechanical control of the reactivity of the nuclear core. A pump 14 circulates the coolant through the core 11, the coolant removing heat from the nuclear fuel elements whereby a part of the coolant water is converted to steam. The stem thus produced is is applied to a turbine 16 which drives, for example, an electric generator 18. Exhaust steam is condensed and returned to the the vessel 10 by a feedwater pump 18.

Figure 2:
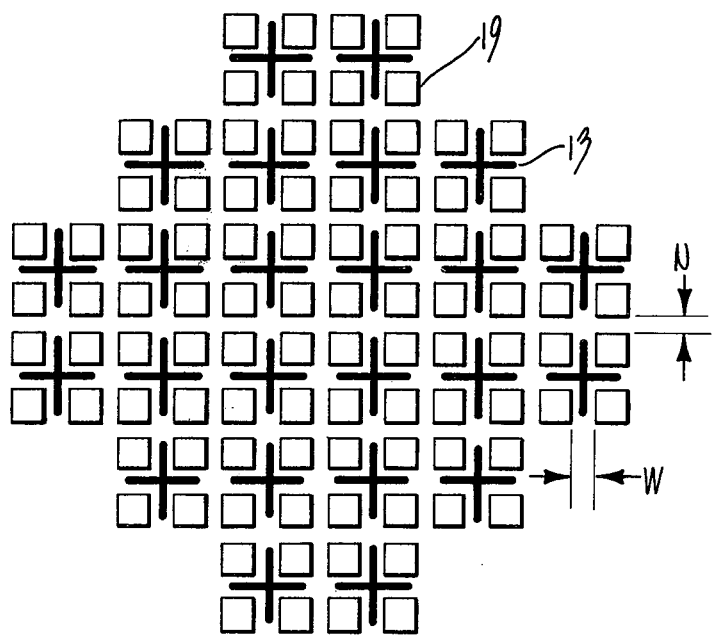
FIG. 2 is a plan view of the nuclear fuel core structure.

A plan view of the core 11 is illustrated in FIG. 2. The core 11 is formed by a plurality of fuel assemblies 19 grouped together in groups of four surrounding each control rod 13. Narrow spaces or gaps (N) are provided between the groups of fuel assemblies while wider spaces or gaps (W) are required between the fuel assemblies of each group to receive the cruciform-shaped control rods. Thus two sides of each fuel assembly are adjacent control rod blade surfaces while the other two sides are adjacent narrow coolant spaces or water gaps (except around the periphery of the core). Each of the fuel assemblies 19 is separately removable from the core 11. In a typical refueling operation about one-quarter of the fuel assemblies are replaced. For example, one fuel assembly of each of the groups of fuel assemblies.

Figure 3:
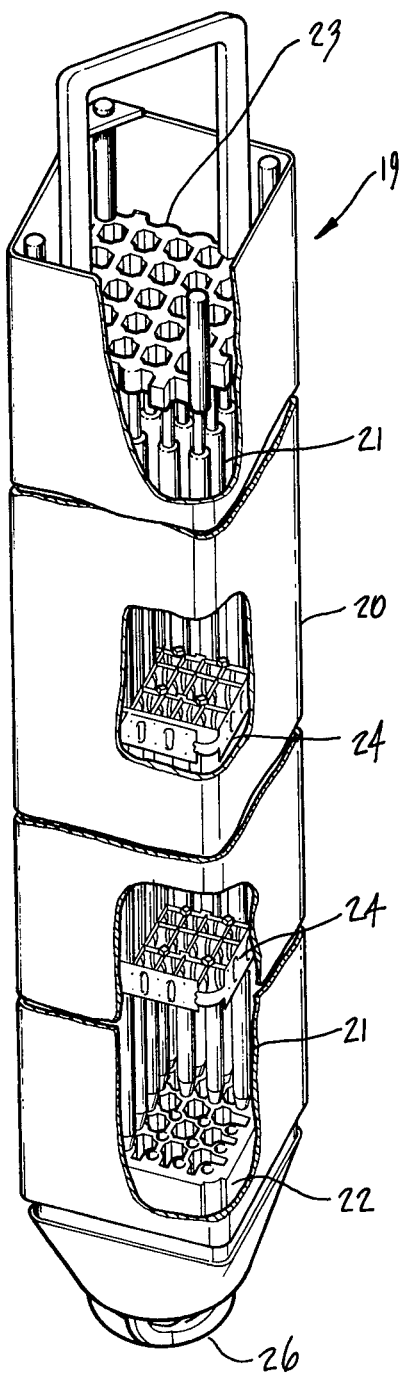
FIG. 3 is a perspective view (partially cut away) of a typical nuclear fuel assembly.

FIG. 3 is a perspective view of a typical separately removable fuel assembly 19, comprising an open-ended tubular flow channel 20 and a plurality of elongated fuel elements or rods 21 supported between a lower tie plate 22 and an upper tie plate 23. The fuel rods 21 pass through a plurality of fuel rod spacers 24 which provide intermediate support. A lower opening 26 receives the flow of coolant water upward past the fuel rods. For several reasons, including spacer impedance and friction of the coolant along the interior walls of the flow channel 20, the coolant flow is greatest through the central portion (past the inner fuel rods) of the assembly.

Figure 4:
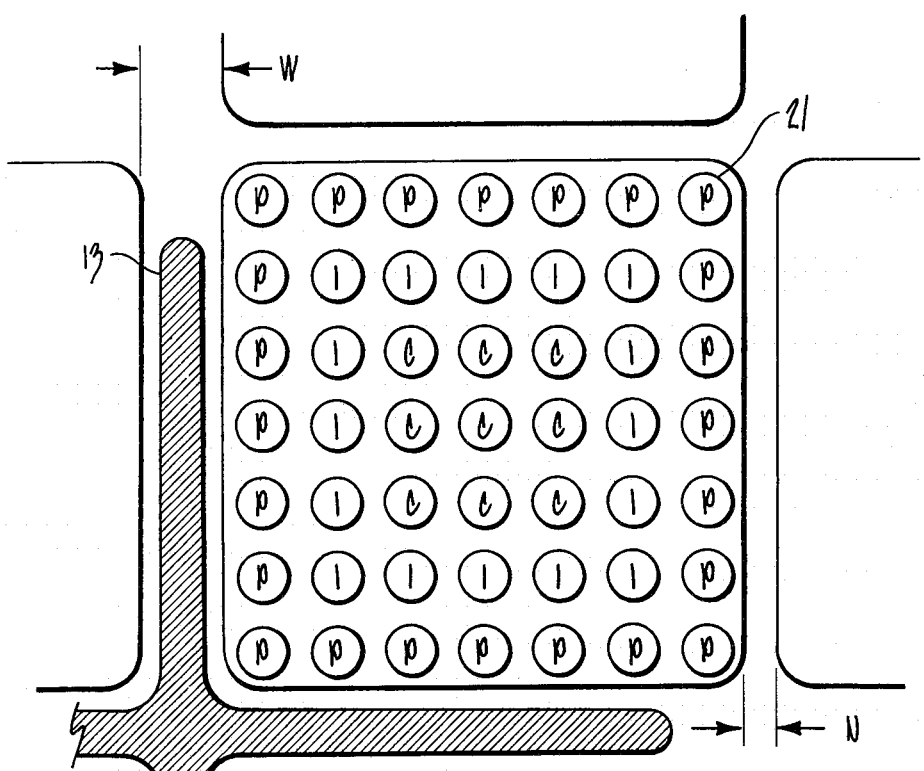
FIG. 4 is a schematic plan view diagram of a nuclear fuel assembly illustrating central, intermediate and peripheral fuel rod groups.

Illustrated schematically in plan view in FIG. 4 is a typical fuel assembly. Although the invention is not limited thereto, the illustrated assembly comprises an array of forty-nine fuel rods arranged in a 7×7 array. The fuel rods are further arranged in a plurality of substantially concentrically located groups wherein the rods of each group may contain differing amounts and kinds of fissile material. By way of example, the fuel assembly of FIG. 4 comprises three groups of fuel rods including a central group of fuel rods designated C, an intermediate group of fuel rods designated I and an outer or peripheral group of fuel rods designated P. In accordance with the invention the fuel rods of each group contain a different amount (including zero) of plutonium whereby the plutonium fuel enrichment is radially varied or graduated across the fuel assembly.

To minimize fuel fabrication costs it is desired to concentrate the plutonium fuel in a minimum number of the fuel rods of the assembly, because the fabrication cost per gram of the radioactive and biologically toxic plutonium decreases as more plutonium is loaded into a fuel rod. Also, the neutron capture rate in Pu-240 is decreased in higher concentrations of plutonium.

In accordance with a first embodiment of the invention the plutonium content of the fuel rods is at least in the inner fuel rods and greatest in the peripheral or outer fuel rods of the assembly. For example, the peripheral fuel rods of group P (FIG. 4) may contain fissile plutonium of from 1–2 atom percent mixed with depleted or natural uranium of 0.25–0.71 atom percent while the fuel rods of Group C and I may contain uranium fuel of about 3 atom percent fissile uranium. This arrangement tends to lower fuel cycle costs and increase fuel reliability in the utilization of plutonium fuel. More specifically, this arrangement provides the following advantages.

Placement of the plutonium fuel near the moderator gaps in the zones of lowest thermal neutron energy minimizes the neutron capture-to-fission ratio to thus maximize neutron economy. The thermal neutron energy spectrum is non-uniform across the fuel core because of the moderator spaces, or water gaps, between the fuel assemblies. The average neutron energy is least around the peripheries of the assemblies because of the moderation effect of the water in the gaps N and W. The plutonium neutron capture-to-fission ratio in thermal reactor is a sensitive function of the thermal neutron energy spectrum to which the plutonium is exposed. This is because of the Pu-239 and Pu-241 resonances at about 0.3 electron volts which exhibit large capture-to-fission ratios. Since the low energy thermal neutron flux is peaked near the water gaps, when plutonium is placed in the peripheral rods of the fuel assemblies, the spatial thermal neutron flux weighting is much greater on the low energy neutron cross sections of Pu-239 and Pu-241 which have a smaller capture-to-fission ratio. Thus concentration of the plutonium fuel in the outer or peripheral fuel rods of the assembly in zones of lowest neutron energy minimizes the neutron capture-to-fission ratio and improves the efficiency of the nuclear reaction.

Also because of the water gaps, the thermal neutron flux is highest in these zones. Plutonium fuel has a higher thermal neutron absorption than uranium fuel. Thus increasing the plutonium fuel concentration toward the periphery of the fuel assembly reduces local neutron flux peaking.

Furthermore, by concentrating the plutonium fuel in the peripheral fuel rods of the fuel assembly, in the high neutron flux zones, the uranium in these fuel rods can be limited to natural or depleted uranium (as recovered from irradiated fuel) to thus minimize uranium fuel costs.

Figure 6:
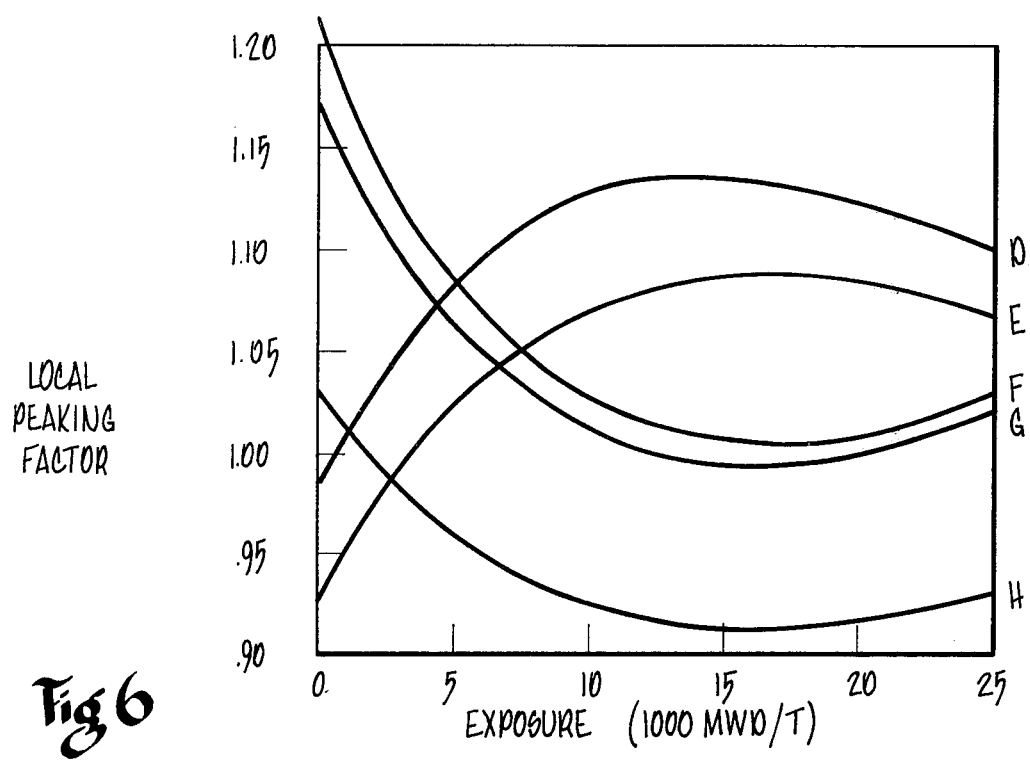
FIGS. 6 and 7 illustrate curves of local peaking factor versus exposure for fuel of given plutonium and uranium content and with a distribution in accordance with a first embodiment of the invention.
Figure 7:
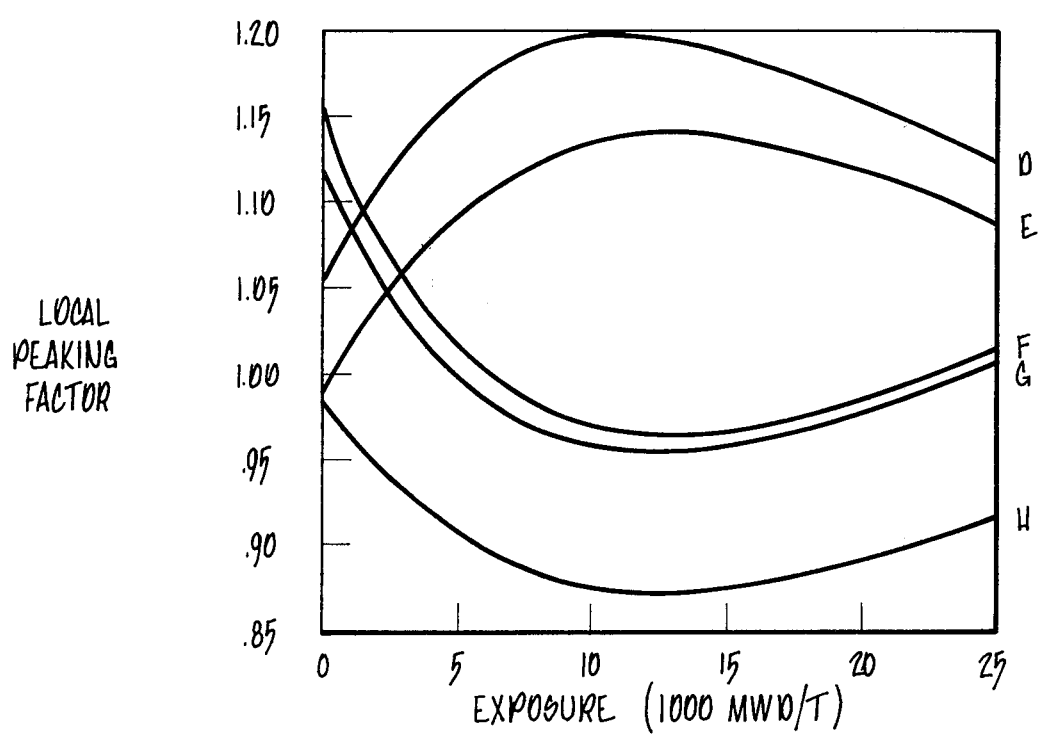

The use of plutonium fuel distributed as shown in FIG. 4 improves fuel reliability. In general the allowable heat flux of the fuel rods decreases with fuel irradiation because of increasing oxide films and deposits and accumulating fission gases which increase thermal resistance and hence the rod clad temperature. Also, in a non-vented fuel rod, the internal pressure increases because of fuel swelling and fission gas build-up. The use of plutonium fuel in the manner shown in FIG. 4 provides a decreasing peak-to-average heat flux with irradiation which, thus, desirably follows the trend of the allowable heat flux of the fuel rods. The decreasing peak-to-average heat flux of plutonium fuel is illustrated in FIGS. 5, 6 and 7.

Figure 5:
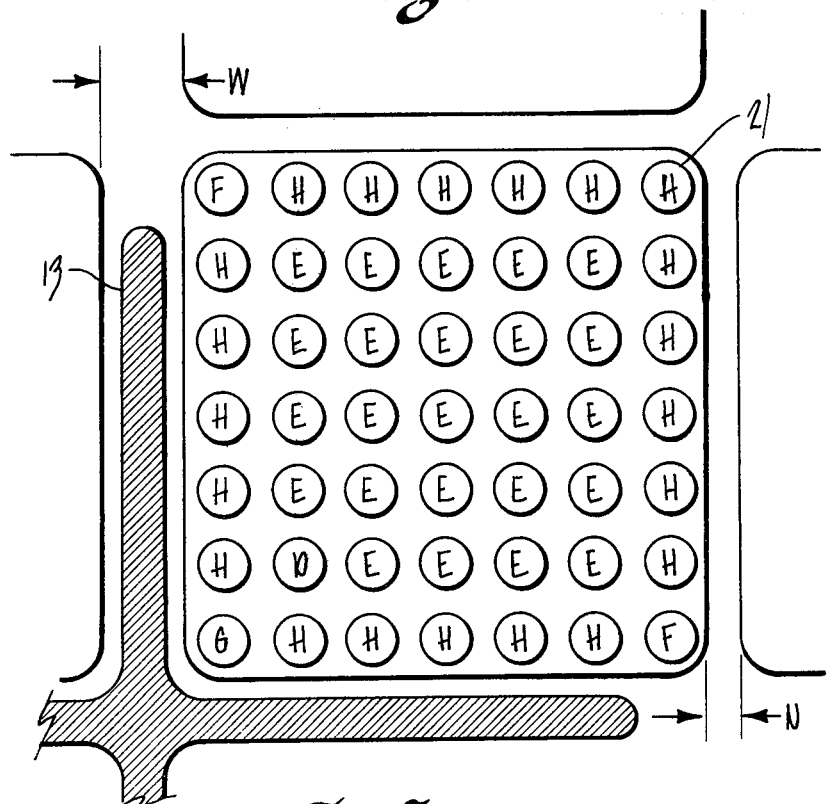
FIG. 5 is a schematic plan view diagram of a nuclear fuel assembly illustrating different fuel rod positions.

FIG. 5 is a plan view of a fuel assembly illustrating five fuel rod positions D, E, F, G and H of fuel rods 21. The fuel rods of these positions operate under different conditions because of their locations in the fuel assembly with respect to other fuel rods and with respect to the water gaps W and N and to the control rod 13. FIGS. 6 and 7 show curves of local peaking factor (peak-to-average rod power) versus exposure (or irradiation) in thousands of megawatt days per ton which illustrate the exposure (or irradiation) time dependent power distributions in the fuel rods in these positions. The curves of FIG. 6 correspond to a fuel distribution wherein the peripheral fuel rods in positions F, G and H contain about 1 atom percent of fissile plutonium mixed with natural uranium of about 0.7 atom percent while the central fuel rods in positions D and E contain uranium enriched to about 3 atom percent. In FIG. 7 the fuel distribution is similar except that the plutonium is mixed with depleted uranium of about 0.3 atom percent. In both cases it is noted that the relative power of the plutonium fueled rods (positions F, G and H) decreases with exposure thus following the trend of the allowable heat flux of the fuel rods.

The plutonium fuel property of a relatively rapidly decreasing peak-to-average power during the early part of its exposure lifetime can be used to advantage to increase the thermal capability of the reactor core. At any given time the thermal capability of a reactor is limited by the thermal capability of the hottest spot thereof. This fact can be expressed in terms of peak-to-average power ratios or peaking factors as follows:

Total(reactor peaking) = (local peaking) × (radial peaking) × (axial peaking)

where, the local peaking factor or local peak/average power is the power of the rod at the hottest point in a fuel assembly divided by the average power of the rods of that fuel assembly in the plane of that point, the radial peaking factor or assembly peak/average power is the power of the hottest fuel assembly divided by the average fuel assembly power, and the axial peaking factor or axial peak/average power is the power of the peak power plane of an assembly divided by the power of the average plane of the assembly.

Figure 8:
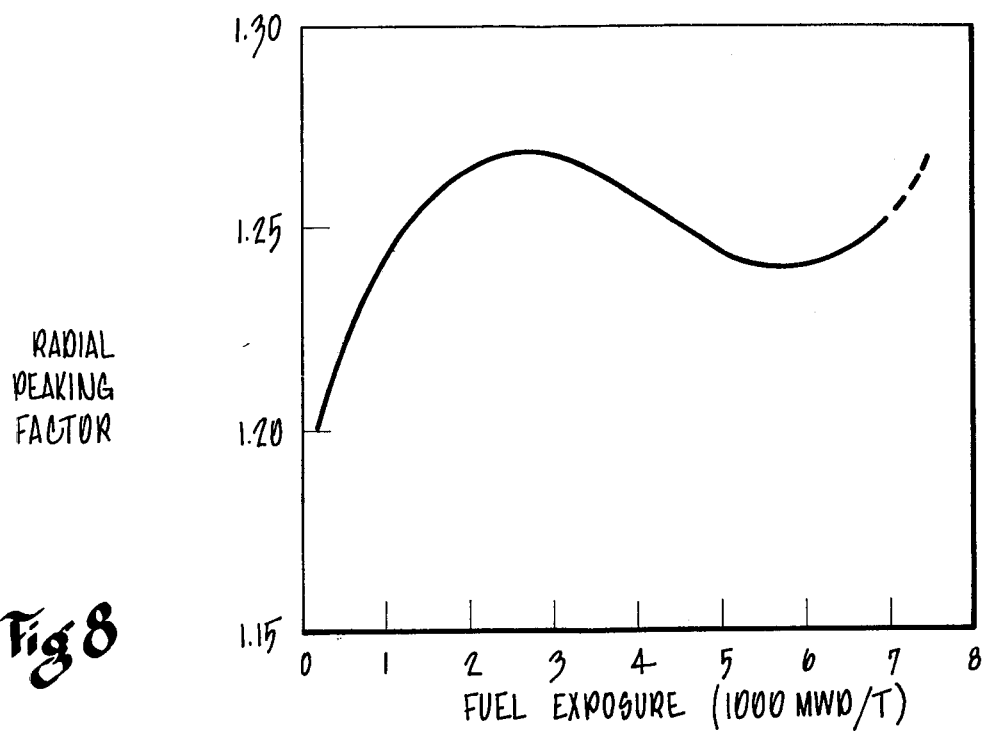
FIG. 8 illustrates the radial peaking factor versus exposure of a typical nuclear power reactor core.

Typical reactor core radial peaking is illustrated in FIG. 8. Typically the radial peaking factor reaches a maximum near the end of a fuel cycle when all of the control rods are substantially withdrawn and are, therefore, no longer available for power flattening. An intermediate peak is also typical (as illustrated in FIG. 8 at about 2500 megawatt days/ton) the exposure time of occurrence and the magnitude thereof depending on the choice of control rod, fueling and burnable poison patterns.

In FIG. 6, for the case of plutonium mixed with natural uranium, the local peaking drops rapidly with exposure to a minimum at about 4800 megawatt days/ton beyond which the local peaking shifts to the central (uranium fueled) fuel rods. Another minimum in local peaking occurs at long exposure. For the case of depleted uranium mixed with the plutonium fuel, as illustrated in FIG. 7, the trends in local peaking are the same. However, a minimum in local peaking occurs earlier at around 2500 megawatt days/ton. It is thus apparent from FIGS. 6 and 7 that the exposure time occurence of the minimum in local peaking can be selectively adjusted by variation of the enrichment of the uranium which is used in the plutonium fueled rods. The exposure time occurence of the minimum in local peaking can also be adjusted by variation of the plutonium enrichment and/or the enrichment of the uranium fueled rods in positions D and E. The position of the intermediate radial peak can be adjusted by selection of control rod or fueling patterns or by the manner in which burnable poisons are incorporated in the fuel. In any case, the use of plutonium fuel provides a local peaking factor characteristic that can be varied so that the time occurrence of the minimum local peaking coincides in exposure time with the maximum radial peaking. In the example illustrated by FIG. 7 (plutonium with depleted uranium in the peripheral rods and enriched uranium in the central rods) the local peaking factor minimum at 2500 megawatt days/ton closely matches the time occurrence of the first peak in radial peaking factor as illustrated in FIG. 8. This increases the thermal capability of the reactor by providing a reduction in total peaking, as is evident from the relationship for reactor peaking set forth above.

As illustrated in FIGS. 6 and 7 and as mentioned hereinbefore, to the right of the minimum in local power peaking the local power shifts to the inner fuel rods of the assembly. In a boiling water reactor, detailed local spatial distribution of boundary layer coolant and the steam voids near the inner fuel rods of the fuel assembly allows the inner fuel rods to sustain from 20 to 50 percent greater heat fluxes than the peripheral fuel rods. Thus peaking in the inner fuel rods will not, in general, be a limitation on the thermal capability of such a reactor.

Additionally, the variation in local peaking among the fuel rod positions exemplified by FIGS. 6 and 7 can be minimized by further gradations in enrichment of the plutonium and uranium fuel. For example, the local peaking curve of the fuel rod in position D can be lowered by using uranium of lower enrichment in this rod, and the local peaking curve of the fuel rods in positions H can be raised by using plutonium and/or uranium of higher enrichment in these fuel rods.

In accordance with a second embodiment of the invention the plutonium is used in the inner fuel rods of the assembly and enriched fissile uranium is used. For example, the central and intermediate fuel rods of groups C and I (FIG. 4) may contain fissile plutonium of 1-2 atom percent mixed with uranium of 0.3-2 atom percent while the peripheral fuel rods of group P may contain 2-3 atom percent fissile uranium. This arrangement provides increased thermal capability. This arrangement is especially advantageous for use in a boiling water reactor.

Figure 9:
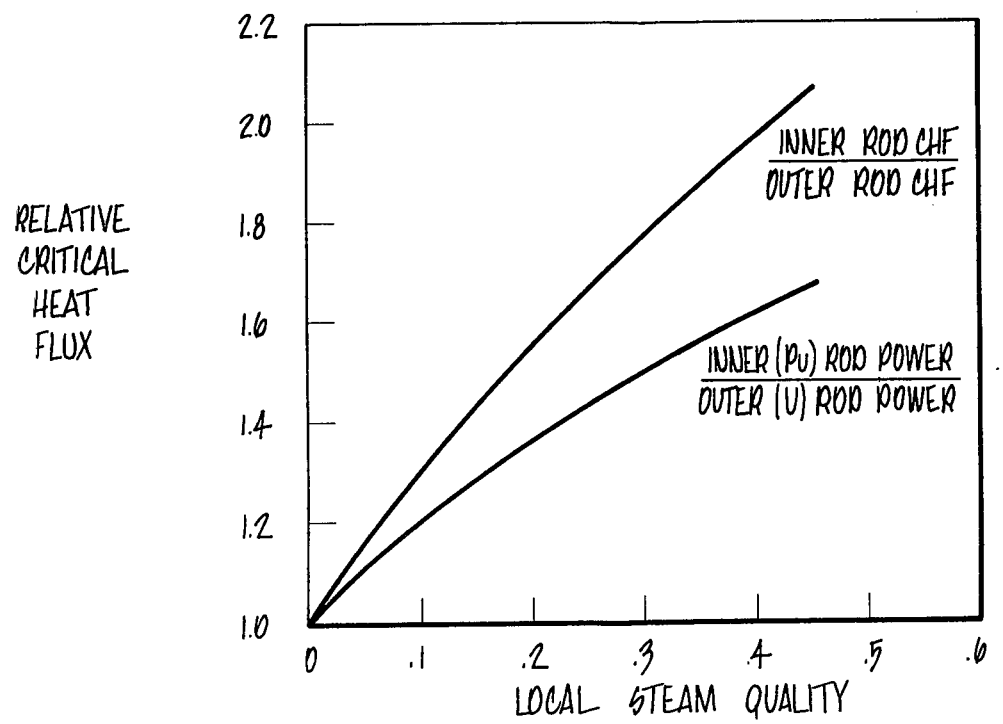
FIG. 9 illustrates the critical heat flux and the fuel rod power trends in accordance with a second embodiment of the invention.

In a boiling water reactor the steam bubbles constitute voids in the moderator along the fuel rods. As the reactor power is increased the moderator void content increases. The fission cross section of uranium fuel decreases more rapidly as voids increase as compared to the fission cross section of plutonium fuel which does not change substantially with voids. Thus the ratio of the power in the inner plutonium fueled rods to the power in the outer uranium fueled rods increases with the increased voids resulting from increased reactor power is shown in FIG. 9.

As mentioned hereinbefore, the inner fuel rods of an assembly have higher heat flux capability than the outer or peripheral fuel rods because of distribution of coolant and steam voids. The operating limit on fuel rod heat flux is designated the critical heat flux (abbreviated CHF). (The critical heat flux is the point at which there is a large increase in fuel clad temperature for a further small increase in heat flux. In a boiling water reactor this is the point of change from nucleate boiling to film boiling.)

With the plutonium fuel concentrated in the inner fuel rods, in accordance with the second embodiment of the invention, the void dependent trend of the ratio inner (Pu)-rod-power/outer (U)-rod-power is in the same direction as the void dependent trend of the ratio inner-rod-CHF/outer-rod-CHF. These trends in power and critical heat flux are illustrated in FIG. 9 wherein the void content of the coolant is expressed in terms of local steam quality. Thus as the void content (and steam quality) increases with increasing reactor power the power in the plutonium fueled inner fuel rods increases relatively more rapidly than the power in the uranium fueled outer fuel rods. This greater increase in the power of the central plutonium fueled rods can be accomodated by the higher critical heat flux of the central fuel rods whereby the thermal capability of the reactor is increased.

Figure 10:
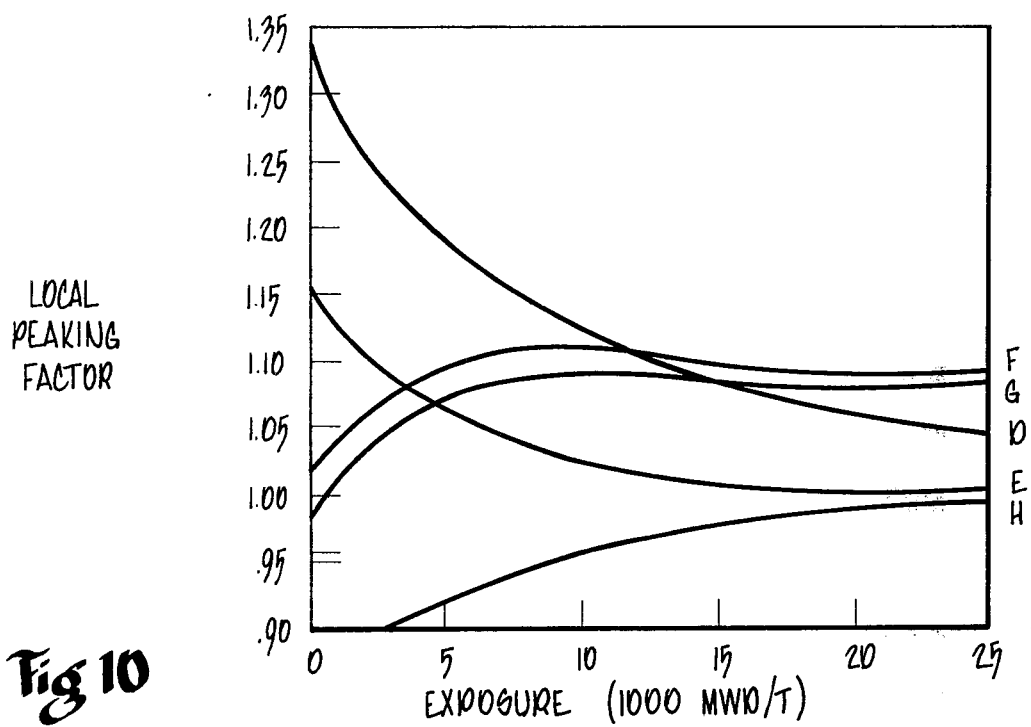
FIGS. 10 and 11 illustrate curves of local peaking factors versus exposure for fuel of given plutonium and uranium content and with a distribution in accordance with the second embodiment of the invention.
Figure 11:
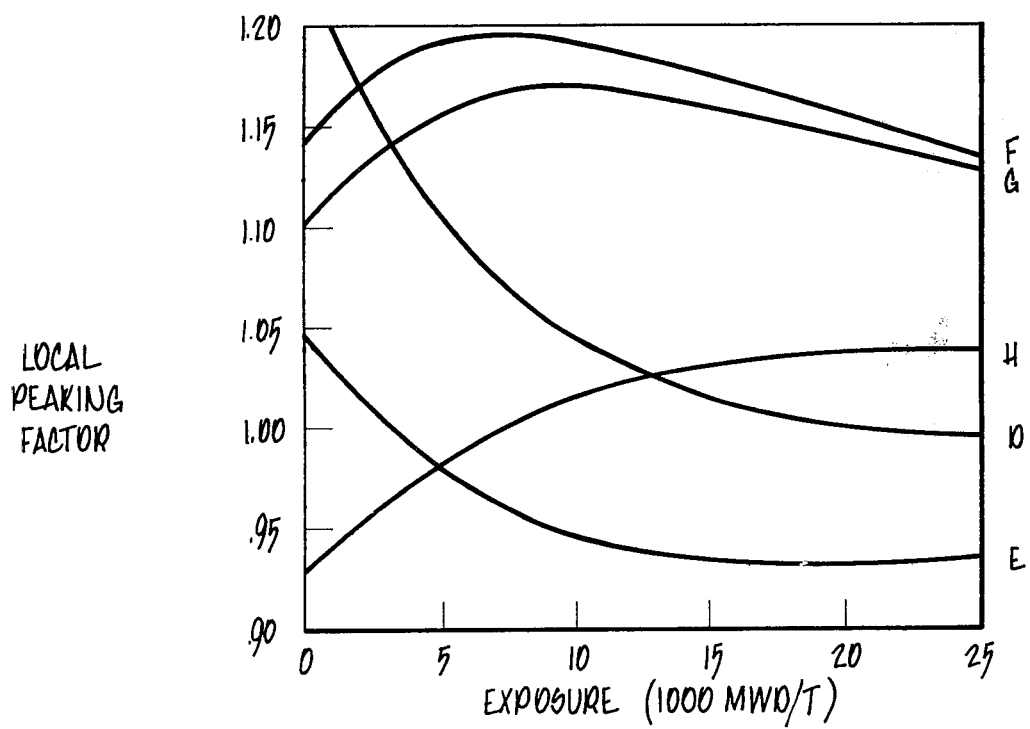

FIGS. 10 and 11 (taken with FIG. 5) illustrate examples of the exposure (or irradiation) time dependent power distributions in the fuel rods for a fuel distribution in accordance with the second embodiment. The curves of local peaking factor versus exposure of FIG. 10 correspond to a fuel distribution wherein the central fuel rods in positions D and E contain about 1 atom percent fissile plutonium mixed with uranium enriched to about 2 atom percent while the peripheral fuel rods in positions F, G and H contain uranium of about 2 atom percent enrichment. The curves of local peaking factor versus exposure of FIG. 11 correspond to a fuel distribution wherein the central fuel rods in positions D and E contain fissile plutonium fuel at about 1.4 atom percent mixed with uranium enriched to about 2 atom percent while the peripheral fuel rods in positions F, G and H contain uranium of about 3 atom percent enrichment.

FIGS. 10 and 11 illustrate that, as in the first embodiment, the enrichments of the plutonium and uranium fuels can be varied to shift the time of occurrence of the minimum in local peaking so that this minimum can be made to coincide in time with the maximum radial peaking (FIG. 8) for increased thermal capability of the reactor. Also, as in the first embodiment, the decreasing local peaking factor improves fuel reliability. Additionally, the variation in local peaking among the fuel rod positions exemplified by FIGS. 10 and 11 can be minimized by further gradations in enrichment of the plutonium and uranium fuel, for example, the peaking in rod D can be decreased by using plutonium of lower enrichment in this rod.

The uranium fuel, in addition to fissile U-235, contains fertile U-238 which is converted to fissile Pu-239 during reactor operation. If plutonium fuel is mixed uniformly in all of the fuel rods, the comparatively large fission and capture cross section of plutonium depresses conversion of U-238 by competition for neutrons. Thus a further advantage of concentrating the plutonium fuel in the inner fuel rods is that conversion of U-238 remains high in the outer or peripheral rods which are located near the water gaps in regions of high neutron flux.

Thus what has been described are arrangements of plutonium fuel for advantageously employing plutonium fuel in combination with enriched uranium fuel in a fuel assembly in a nuclear power reactor.

While illustrative embodiments of the invention have been described herein, modifications and adaptations thereof may be made by those skilled in the art without departure from the spirit and scope of the invention as defined by the following claims, for example, the fertile nuclide U-238 may be replaced with Th-232 and the fissile nuclide U-235 may be replaced by U-233 or any mixture of U-235 and U-233 without affecting the advantages and scope of the invention.

What is claimed is:

1. A nuclear fuel element assembly for use with other fuel assemblies in a thermal reactor, comprising: a plurality of elongated fuel elements, and means supporting said fuel elements in a spaced, substantially parallel array, said fuel elements being arranged in a plurality of radially separate groups in said assembly, the initial fissile fuel in the fuel elements in at least one group initially consisting of enriched fissile uranium, and the fuel elements in at least one other group containing initial fissile plutonium, said plutonium containing fuel elements comprising at least nine of the fuel elements of said fuel element assembly wherein the fuel elements in said other group are located in outer fuel rod positions of said assembly.

2. The fuel element assembly of claim 1 wherein the initial plutonium is mixed with natural uranium.

3. The fuel element assembly of claim 1 wherein the initial plutonium is mixed with depleted uranium.

4. A fuel assembly for use with other fuel assemblies in a thermal nuclear reactor fuel core, comprising: a plurality of spaced-apart elongated fuel elements and means for supporting said fuel elements in a substantially parallel array, the fuel elements being arranged in a plurality of groups, each group consisting of a plurality of adjacent fuel elements, the fuel elements of at least one group containing initial fissile plutonium mixed with uranium, and the initial fissile fuel in the fuel elements of at least one other group consisting of enriched uranium wherein the fuel elements of said other group occupy inner fuel element positions and the fuel elements of said one group occupy outer fuel element positions.

5. A nuclear fuel element assembly adapted for use with other fuel assemblies and a neutron moderator in a fuel core capable of self-sustained thermal neutron induced chain nuclear fission reaction, said fuel assembly comprising: a plurality of elongated nuclear fuel elements spaced apart from one another by means supporting said fuel elements in substantially parallel relation, at least nine of the fuel elements of said fuel assembly comprising a first group of said fuel elements initially containing fissile plutonium, and a second group of said fuel elements the initial fissile material of which consists of enriched uranium, the radial variation across said fuel assembly of the initial plutonium fuel enrichment of the plutonium containing fuel elements being at least 1.5 atom percent wherein the fuel elements having the lowest initial plutonium content are positioned in the inner fuel element positions of said assembly.

6. A nuclear fuel assembly for use with other fuel assemblies in a thermal reactor, comprising: a plurality of elongated fuel elements and means supporting said fuel elements is spaced substantially parallel relation, said fuel elements being arranged in a plurality of groups including an inner group consisting of a plurality of said fuel elements and at least one outer group each consisting of a plurality of said fuel elements arranged around said inner group, the fissile fuel in the fuel elements of at least one group initially consisting of enriched uranium, and the fuel elements of at least one other group containing initial fissile plutonium, the initial plutonium content of the fuel of the fuel elements of one plutonium containing group differing from the initial plutonium content of the fuel of the fuel elements of any other plutonium containing group wherein the plutonium content of the groups containing initial plutonium is graduated from highest plutonium content in the fuel elements of the outermost plutonium containing group to lowest plutonium content in the fuel elements of said innermost plutonium containing group.

7. The fuel element assembly of claim 6 wherein the initial plutonium is mixed with natural uranium.

8. The fuel element assembly of claim 6 wherein the initial plutonium is mixed with depleted uranium.

* * * * *